United States Patent [19] [11] 4,210,231
Seitz [45] Jul. 1, 1980

[54] POWER WHEEL FOR FOLDING DOORS

[75] Inventor: Robert F. Seitz, Mentor, Ohio
[73] Assignee: The Youngstown Steel Door Company, Cleveland, Ohio

[21] Appl. No.: 955,159
[22] Filed: Oct. 27, 1978
[51] Int. Cl.[2] .............................................. F16D 67/00
[52] U.S. Cl. ....................................... 192/8 R; 64/23; 74/491; 105/355; 160/180
[58] Field of Search ...................... 64/9 R, 23, 23.5, 4, 64/10; 105/376, 368 R; 74/491, 107, 497, 485, 486, 519, 523, 524, 22 R, 56; 192/8 R

[56] References Cited

U.S. PATENT DOCUMENTS

| | | | |
|---|---|---|---|
| 1,758,426 | 5/1930 | Black | 64/23.5 |
| 2,071,235 | 2/1937 | Newman | 74/497 |
| 3,938,446 | 2/1976 | Seitz et al. | 105/368 R |

*Primary Examiner*—Ira S. Lazarus
*Assistant Examiner*—Magdalen Moy
*Attorney, Agent, or Firm*—John H. Mulholland

[57] ABSTRACT

A rail car having an interior cavity and an end opening for loading and unloading lading is provided with a pair of door assemblies, each of which includes a plurality of panels, each pivotally movable with respect to the other for closing at least a portion of the end opening. Pivot means comprising a shaft for mounting each of the door assemblies are provided to move the door assemblies between their respective open position and closed position. The pivot means are mounted for movement toward and away from the interior of the rail car on a track to permit storage of the door assemblies within the rail car when their panels are folded back upon one another. The shaft is manually driven by means of a housing. A rack and a source of rotational power including a cooperating pinion mounted on the shaft act to guide, move and lock the door. The housing has a cavity into which one or more enlarged lever ends are inserted and secured before assembly of the housing to the shaft. The levers may be stored parallel to the shaft to conserve valuable space when not in use but can be moved transverse to the shaft to increase the mechanical advantage and therefor power applied through the housing to the shaft during use. A spring biased pawl controlled by a cam surface on the housing normally prevents rotation of the pinion and, therefore, normally locks the door assemblies in the storage position. Manual rotation of the shaft axially cams the housing and creates rotation of the pawl to permit rotation of the pinion and movement of door assembly out of the storage position.

7 Claims, 6 Drawing Figures

POWER WHEEL FOR FOLDING DOORS

BACKGROUND OF THE INVENTION

Broadly, it has been known to use triple-fold doors and triple-fold doors on the ends of decked automobile transit rail cars to prevent vandalism, pilferage, etc. during transit of the car. An example of such a car is U.S. Pat. No. 3,938,446 issued Feb. 17, 1976 to the present inventor, Robert F. Seitz and two co-inventors.

The instant invention is an improvement over that patent in that it discloses an improved source of rotational power for moving the door assemblies into and out of the storage position and further includes improved movable mounting means in the form of a track along which the door assembly travels into and out of the storage position, both of which improvements provide an increased width between the opened doors by moving the center line of the pivot means closer to the corner housing in a manner that will be seen from the description of the invention to follow.

The power wheels referred to in U.S. Pat. No. 3,938,446 provided a mechanical advantage determined by the diameter of the housing and this, of course, is limited by the proximity of the adjacent structure. The new power wheel of the instant invention uses handles which literally fold and then may be lifted into a transverse position for use in turning the shaft through a portion of a revolution and then dropped. The lifted handle provides a mechanical advantage not dependent on the allowed diameter and the folded handles provide a smaller diameter than did the power wheel of the referenced patent. The method of retaining the handles in the housing provides great strength when compared to the conventional means of holding handles by means of hinge pins and lugs, in that enlarged cavity portions in the housing are provided into which enlarged ends on the levers or handles are seated. The size and shape of the openings through which the levers extend to the exterior is such that the levers may be moved from a position basically parallel to the shaft to a position transverse to the shaft in which a greater mechanical advantage is supplied. The details of how this is accomplished will be seen from the brief description to follow.

BRIEF DESCRIPTION OF THE INVENTION

The invention involves a rail car having an interior cavity defined partially by rail car side walls and an end opening for loading and unloading lading such as vehicles. Two door assemblies, each including a set of three panels, are provided for closing the end opening. Each of the sets of panels closes one-half of the opening and folds back upon the other panels of the set by means of hinges at the edges thereof for storage. The sets of door panels are each pivotally mounted adjacent the sides of the opening by means which can move on a track toward and away from the intermediate portion of the car to permit storage of the sets of folded panels along said rail car side walls.

The means for moving the pivot means include a guide means in the form of a pair of rack and cooperating pinions drivingly mounted on a common manually driven shaft. One each of the pinions cooperates with a rack adjacent the top and bottom portions of the set on the respective side wall of the rail car to keep the top and bottom portions of the set in register during travel along the track. The racks extend toward the intermediate portion of the car from the opening and the door sets are supported for movement therealong to and from the storage position.

The shaft upon which pinions for alignment purposes are mounted have power wheels or housings on the lower ends thereof. As each of the shafts are turned by means of its respective drivingly connected housing, a pawl rides over the teeth of a pinion until the door set is in proper position along a side wall of the car. The housing drives by means of a driving cam surface portion on the housing acting against a pin projecting from the shaft. An angular portion of the same cam surface is provided so that as the door is moved out of the storage position, the housing moves axially, and in so doing, automatically removes the pawl from the teeth of the pinion by means of the outer top housing cam surface in driving connection with the pawl. Without this axial movement, of course, the pawl holds the pinions from moving on the rack and, therefore, holds the door set in its stored position.

The instant invention includes an improvement in the source of rotational power for the shaft upon which the pinions are mounted. The levers or handles which drive the housing are provided such that they may be stored in a folded position or a position substantially parallel with the shaft but they may be individually used in positions transverse to the shaft to apply manual force to the housing, which, in turn, drives the shaft. The shaft containing the housing cavity has enlarged portions which are of such size and shape as to receive enlarged portions of the handles or levers and permit the levers to move from a substantially parallel position with the shaft to a substantially transverse position in which they can give increased mechanical advantage. This is done without the use of pins and since the levers or handles bear directly against the housing during use, a strength is provided which would not be present if hinge pins and lugs were utilized in a manner which would result in a loss of the economy of space accomplished by this arrangement.

The method of assembling the components of the source of rotational power permits the accomplishment of these desirable ends in that the opening through which the levers or handles extend to the exterior from within the housing have portions in register with a portion of the shaft opening of the housing such that the end of the handle to extend exteriorly of the assembly can be passed through the shaft opening and thence through the transverse housing opening. With the handles in place with their enlarged inner ends seated in the enlarged cavity portions of the housing, the housing and handle assembly is slid over the shaft and a pin inserted in a hole in the shaft and welded in place to provide the driving projection of the shaft for engagement with the driving cam surfaces of the housing.

Thus it will be seen that an increased door opening for the loading and unloading of vehicles through the end of the rail car can be provided because of the compact nature of the source of rotational power even though an increased mechanical advantage over those sources of rotational power previously known for use with door assemblies for closing rail car end openings has been accomplished.

DETAILED DESCRIPTION OF AN EMBODIMENT OF THE INVENTION

In the embodiment illustrated, the numeral 10 generally designates a rail car.

Figure 2:
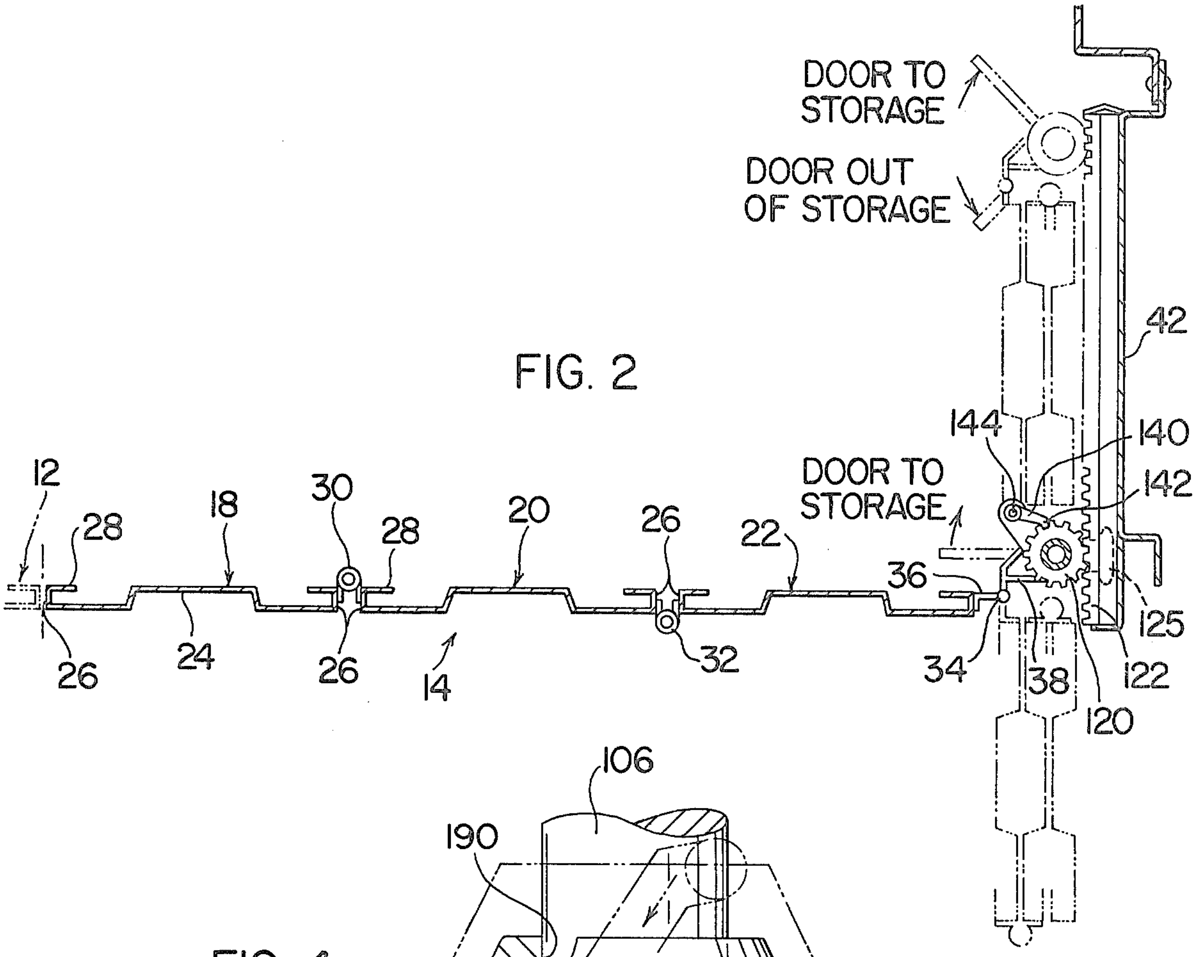
FIG. 2 is a cross-sectional view taken along the line 2—2 of FIG. 1 showing the different door panel positions in phantom.

The rail car 10 has an end opening which has its left-hand half closed by a three-paneled door set 12 and its right-hand half closed by a three-paneled door set 14. The door panel sets 12 and 14 can be termed "triple-fold" door assemblies. Car 10 is of the closed three-tier automobile transport type, including three decks, A, B and C, respectively, on which ladings such as vehicles are stored for transit. As seen in FIG. 2, wherein the door panel set 14 is illustrated, the doors are capable of assuming three basic positions. In the illustrated full view position of FIG. 2, the door panel set 14 is closed. The triple-folded storage position within the car is shown in phantom, as is the triple-folded open position.

The hinge arrangement which makes this possible will be seen by referring to door panel set 14 in FIG. 2 wherein panels 18, 20 and 22 are shown in a cross-sectional view in the closed position. Panels 18, 20 and 22 are preferably made of 16 gauge metal. The panels all have an elongated vertical reinforcing rib 24 formed therein and all of the panel edges 26 have an inwardly extending flange 28 for further stiffening purposes. The adjacent edges 26 of the three panels 18, 20 and 22 have hinges welded thereto. The panels 18 and 20 have an inwardly disposed hinge 30 with leaves welded to their respective and adjacent edges 26, and the panel 22 and the adjacent edge of panel 20 have an outwardly extending hinge 32 similarly welded to the adjacent edges 26 of these panels. Panel 22 has a hinge 34 with an L-shaped leaf 36 welded to panel edge 26, and an angular Y-shaped leaf 38 fixedly mounted by welding to a pipe section 40. The hinge or pivot 34 permits swinging of the three panels outwardly or inwardly toward positions parallel to the wall 42 of the car 10.

Figure 1:
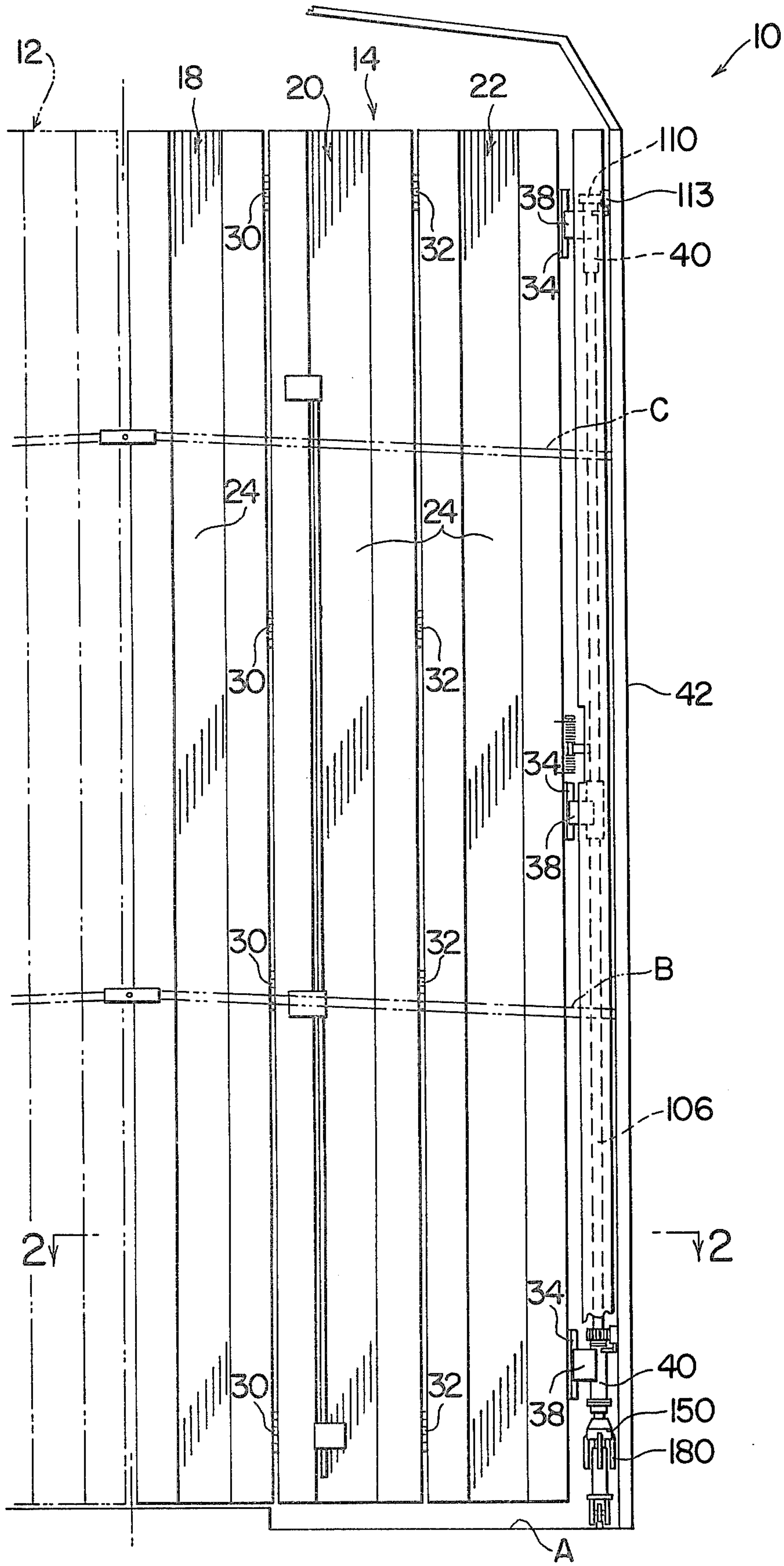
FIG. 1 is an end elevational view of one-half of the rail car constructed according to the principles of this invention with a fragmentary area in the lower right portion broken away for clearity.

In FIG. 1 it will be seen that the panels 18, 20 and 22 are illustrated in the fully closed position. Between the adjacent panel edges 26, the panels have a plurality of hinges along their length. For instance, between the panels 18 and 20 there are four hinges 30; between the panels 20 and 22, there are four hinges 32; and between the pipe 40 and the panel 22, there are three hinges 34.

The three-panel door assembly 14 is mounted to the car by means of the panel 22, the hinge 34 associated with its edge 26, and the pipe section 40 to which the Y-shaped leaf 38 is welded. A pinion shaft (or pipe) 106 is journaled within the pipe section 40 and is shown with thrust bearings 108 thereabout and pipe stop ring 109 rigidly mounted to the shaft 106. The upper end of shaft 106 has rigidly attached thereto a pinion 110. Pinion 110 rotates with shaft 106 by means of its mounted relationship within the pipe 40 and the teeth thereof engage a rack (not shown). The rack is a forged piece of metal and is mounted on a rack support plate 113 running paralel to the wall of the car horizontally and into the interior of the car.

A lower pinion 120 is mounted rigidly with regards to shaft 106 and cooperates with a rack 122. The rack 122 is coextensive and parallel to rack 112 and because the pinions 110 and 120 are commonly mounted on the opposite ends of shaft 106, the top and bottom portions of door assembly 14 remain in register at all times and in particular during movement to and from the stored position at the inner end of racks 112 and 122. A rack support plate 123, similar to plate 113, supports rack 112.

A skid 125 is provided for travel behind the rack 122.

Horizontally mounted below the shaft 106 on deck A is a track 131 which extends from the car opening to the interior of the car along and spaced from wall 42. A fabricated plate roller cage or hanger 133 is mounted by means of welding to pipe 135. The lower end of shaft 106 is journaled in pipe 135 with suitable thrust bearing means generally designated 137. If shaft 106 is constructed of a hollow pipe, then a solid extension 139 is preferably welded to the end thereof projecting downwardly for engagement with the thrust bearing 137. A roller, mounted on pin 138 movably supports the triple-fold door assembly 14 for movement along track 131 to and from the storage position. The shaft or pipe 106 and pinions 110 and 120 maintaining the top and bottom in register by cooperation with their respective racks 112 and 122.

The pinion 120 is engaged by a pawl 140 which acts to positively lock the pinion in the storage position at its innermost end of travel on the rack 122. Because of the shape of the end portion of pawl 140, the pawl slides over the teeth of pinion 120 as it rotates along rack 122 into storage position. Unless end portion 142 is rotated on pawl shaft 144 out of engagement with the pinion, however, reverse rotation is impossible.

Shaft 144, on which the pawl 140 rotates, is journaled in two plates 146 which extend laterally outwardly from, and are welded to, lower pipe section 40. A spring 148 biases the shaft 144 so that pawl portion 142 normally prevents rotation of pinion 120 for outward movement of door assembly 14.

The shaft 106 is manually driven by crank means in the form of housing or power wheel 150. A projection in the form of a pin 152 is mounted by welding in a hole the end of shaft 106 for driving connection between the housing 150 and the shaft 106 on which it is mounted. Upon rotation of housing 150 to move the folded door assembly 14 into or out of storage position along racks 112, 122 and the track 131, a cam surface generally designated 156 drivingly cooperates with pin 152 to drive shaft 106.

Upon desiring to move the folded door package 14 out of the storage position, the operator grasps one of the crank handles or levers 180, moves it transverse to shaft 106 and rotates until pin 152 engages cam surface portion 160 of the housing. Because of the angular shape of surface 160, the housing 150 is moved axially upwardly along the shaft 106 for a limited distance as it rotates. At the end of its travel in said limited distance, pin 152 engages a second cam surface portion 161 such that a positive driving connection between housing 150 and shaft 106 is re-established for outward driving of the door assembly 14.

Mounted on the lower end of pawl shaft 144 for rotation therewith is a cam follower 162. Cam follower 162 has a laterally extending portion 164 in engagement with surface 170 of housing 150 acting on cam surface 160. Surface 170 rotationally drives portion 164 radially away from shaft 106. As housing 150 moves axially upward, this action automatically drives pawl shaft 144 and pawl 140 moves away from pinion 120, thereby freeing door assembly 14 for movement outwardly along rack 122 from the stored position to the open position.

The source of rotational power for moving the door out of storage includes a shaft or pipe 106 having a pin 152 in an opening therethrough and extending from either end thereof. Pin 152 is held by means of weld 172 into secure position therewith. Each of the cam surface portions 160 and 161 of housing 150 have a corresponding portion 160*a* and 161*a* located 180° about the shaft to provide for added strength and power transmission capabilities from the pin 152 to the housing 150. The housing 150 has enlarged cavity portions 175 which, in the illustrated embodiment, are four in number. Each of these enlarged cavity portions 175 are communicated by a transverse opening 176 to the exterior of housing 150.

Torque is provided to housing 150 by means of foldable handles or levers 180 having end portions 181 extending exteriorly of the housing 150 through the openings 176. Handles 180 have enlarged inner ends 185 preferably extending transversely to the longitude of the handles. The folding handles 180 are of such size and shape relative to the size and shape of the openings 176 that their intermediate portions 186 between exterior ends 181 and enlarged end portions 185 at their opposite and inward ends can move within the openings 176 from a position where the ends 181 and the intermediate portions 186 are parallel to the shaft 106 until they extend transversely to shaft 106 for maximum mechanical advantage as shown in phantom in FIG. 4.

Figure 4:
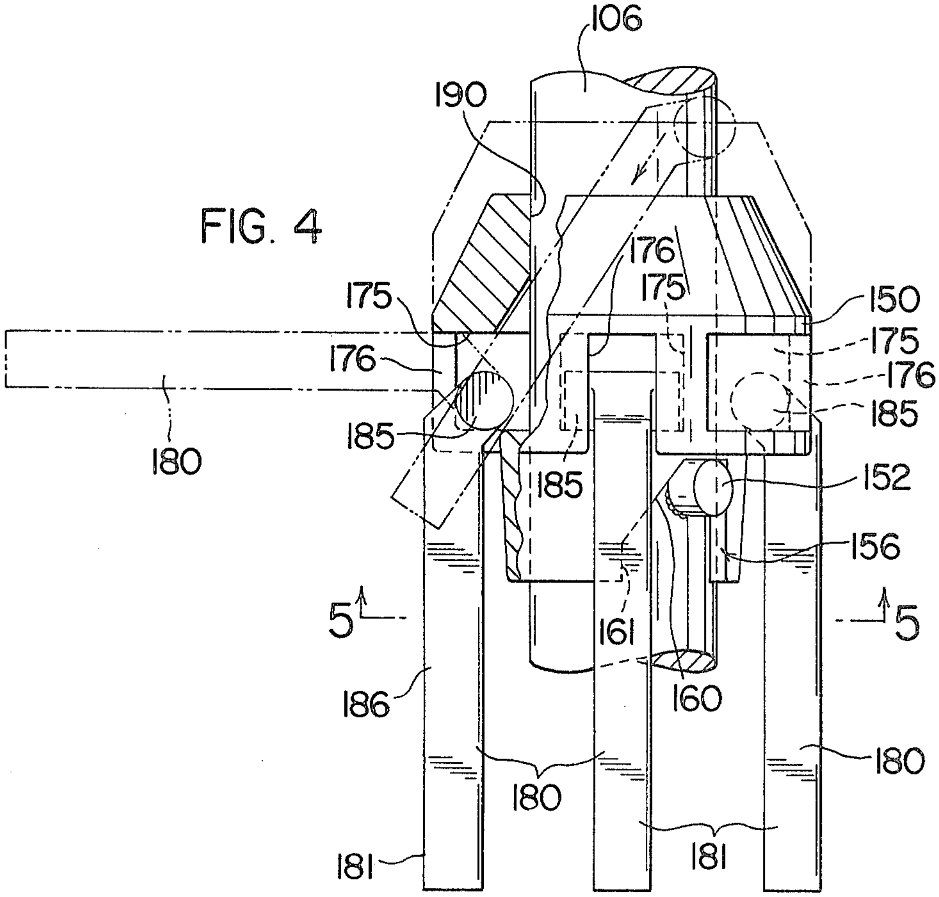
FIG. 4 is an enlarged elevational view of the source of rotational power of FIG. 3 with positions of the handles shown in phantom both during assembly and during use.
Figure 3:
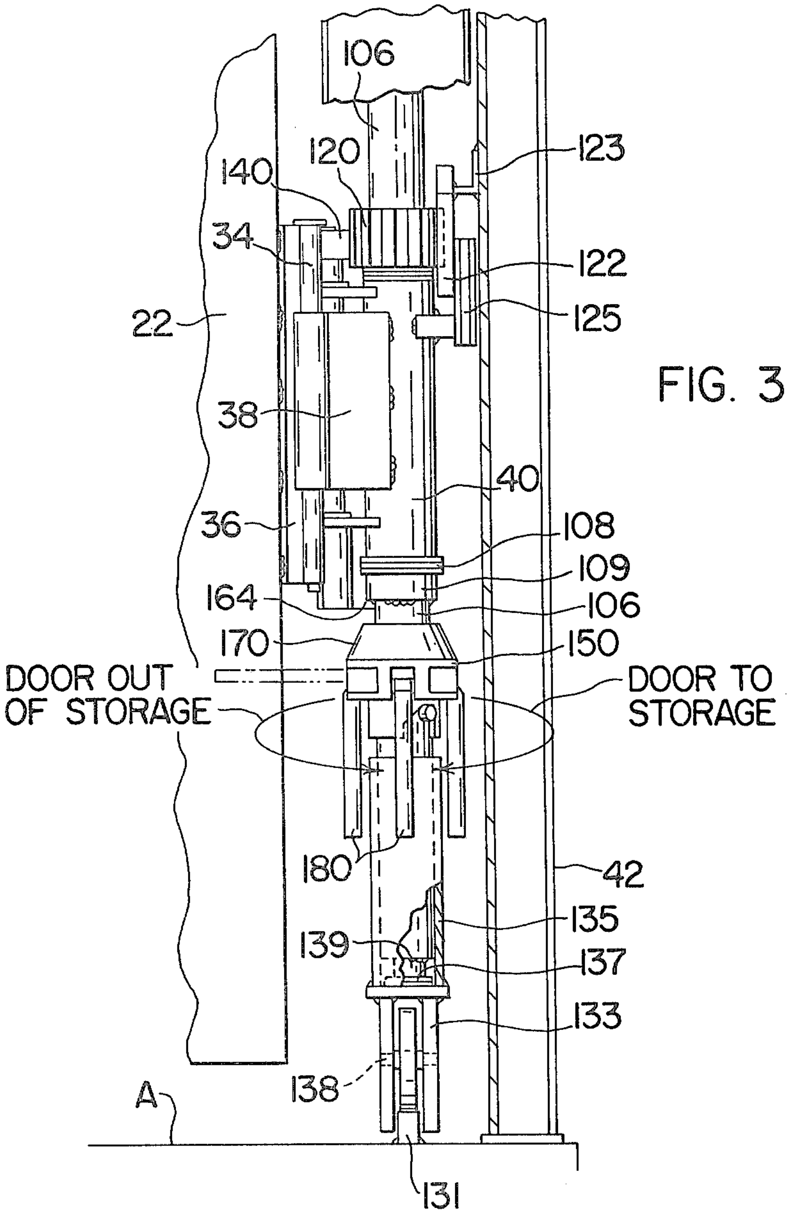
FIG. 3 is an enlarged fragmentary view of the area shown broken away in FIG. 1.
Figure 5:
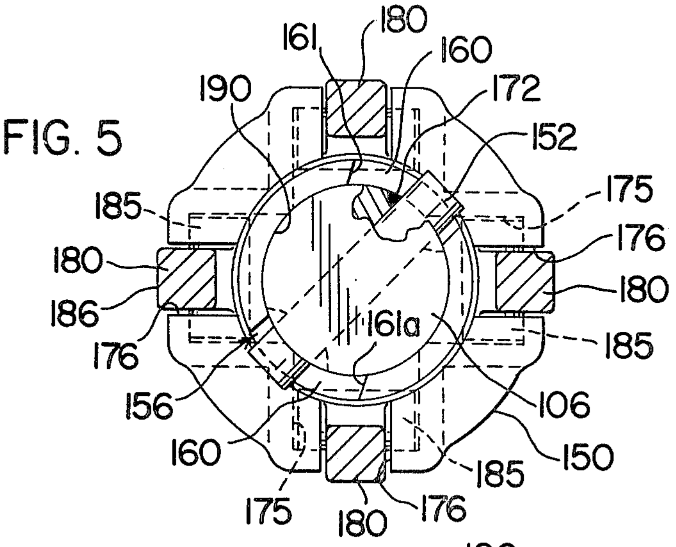
FIG. 5 is a cross-sectional view taken along the line 5—5 of FIG. 4.
Figure 6:
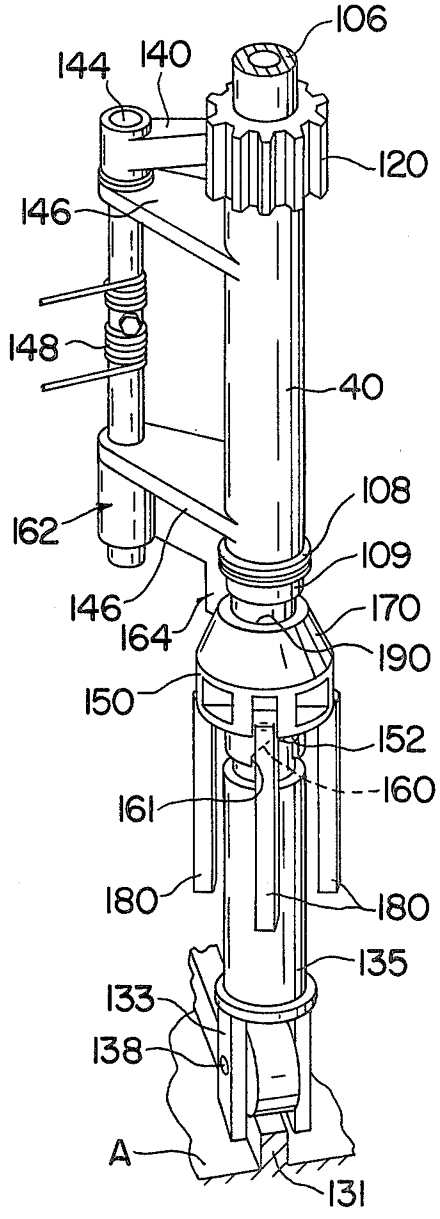
FIG. 6 is a pictoral view of the mechanism of FIGS. 1 and 3 with certain of the environmental structure omitted to clarify the view.

Also shown in phantom in FIG. 4, is the manner in which assembly of the combination is accomplished. Housing 150 has a shaft opening 190 which is of such size and shape that it has portions in register with the openings 176 so that the lever ends 181 may be passed through the shaft opening 190 and through the openings 176. The size of opening 190 will permit clearance of the enlarged end portions 185 of the elongated members 180 during their passage into enlarged cavity portions 175.

Accordingly, the sequence of assembly is such that the appropriate number of handles, one for each enlarged cavity portion 175 of the housing 150, is passed through the portion of the openings 176 and 190 in register until the enlarged portions 185 are seated in the enlarged portions 175 of the cavity of housing 150. With the housing having the assembled levers or handles 180 in place, the shaft 106 is slid into opening 190 and the pin 152 is inserted through the opening in the pipe or shaft 106 and welded thereto with both ends projecting therefrom.

By means of this assembly, it will be seen that a source of rotational power is provided which is of particular benefit in a combination of movable mounting means for closing the end opening of a railroad car wherein the power transmitting housing or power wheel uses folding handles which may be lifted into position for use in turning the shaft through a portion of a revolution and then dropped. The lifted handle will provide a mechanical advantage which is not dependent upon the allowed distance between the shaft 106 and wall 42, for example, since the folded handles provide a smaller diameter than did power wheels of the prior art.

Accordingly, for a given width of car, a greater opening may be provided for loading of lading such as automobiles. Moreover, the novel method of retaining handles in a power wheel housing minimizes labor and provides great strength when compared to conventional means of holding handles using hinge pins and lugs since the use of hinge pins and lugs of sufficient strength would require a larger size power wheel than the instant invention.

I claim:

1. A source of rotational power which includes in combination:

a shaft to be driven, a housing drivingly connected to said shaft and enclosing a portion thereof within a housing cavity, at least one opening in said housing wall oriented generally transversely to said shaft communicating said cavity with the exterior, an elongated member having an enlarged portion adjacent a first end thereof, said cavity including an enlarged portion adjacent the inner end of said opening to receive said enlarged portion of said elongated member, a second end of said elongated member opposite said first end extending exteriorly of said housing with an elongated portion of said elongated member connecting said first and second ends, said elongated portion extending through said opening, said opening being of such size and shape that said enlarged portion of said elongated member is retained in the enlarged portion of said cavity and is prohibited from passing through said opening and said elongated portion of said elongated member is free to move within said opening from a position at which it is substantially parallel to said shaft to a position at which it is substantially transverse to said shaft.

2. The source of rotational power of claim 1 in which the housing wall surface defining the shape of said opening transmits force manually applied adjacent said second end of said elongated member from said elongated member to said housing thereby rotationally driving said shaft.

3. The source of rotational power of claim 1 in which the shaft extends from the housing cavity through a shaft opening, said shaft opening and said opening in said housing wall oriented generally transversely to said shaft having portions in common register and said second end of said elongated member being of such size and shape that it is capable of being aligned with the portions of the openings in common register.

4. The source of rotational power of claim 2 in which the shaft has a transverse pin extending therefrom which engages a surface portion of said housing to provide the driving connection between said housing and said shaft.

5. The source of rotational power of claim 4 in which the pin is welded to said shaft.

6. The source of rotational power of claim 5 in which the surface portion of said housing in contact with said pin is a cam surface which drives said housing axially along said shaft when said force is manually applied to said elongated member.

7. The source of rotation of claim 6 in which said axially moving housing drivingly engages a cam connected to a pawl, said pawl being normally spring biased in engagement with a pinion on said shaft but being disengaged therefrom upon said axial movement of said housing.

* * * * *